(12) United States Patent
Bertram

(10) Patent No.: US 7,993,022 B2
(45) Date of Patent: Aug. 9, 2011

(54) ILLUMINATING MODULE FOR A LIGHTING DEVICE

(75) Inventor: Ralph Peter Bertram, Nittendorf (DE)

(73) Assignee: Osram Gesellschaft mit beschränkter Haftung, Munich (DE)

( * ) Notice: Subject to any disclaimer, the term of this patent is extended or adjusted under 35 U.S.C. 154(b) by 267 days.

(21) Appl. No.: 12/200,028

(22) Filed: Aug. 28, 2008

(65) Prior Publication Data

US 2009/0059565 A1    Mar. 5, 2009

(30) Foreign Application Priority Data

Aug. 31, 2007    (DE) .......................... 10 2007 041 193

(51) Int. Cl.
*G09F 13/04* (2006.01)
(52) U.S. Cl. ................... 362/97.3; 362/231; 362/249.06
(58) Field of Classification Search ................. 362/97.2, 362/97.3, 231, 249.02, 249.06, 249.14, 612, 362/800; 313/500
See application file for complete search history.

(56) References Cited

U.S. PATENT DOCUMENTS

| | | | | |
|---|---|---|---|---|
| 4,491,863 A * | 1/1985 | Kurahashi | ..................... | 313/500 |
| 5,758,951 A | 6/1998 | Haitz | | |
| 6,474,839 B1 | 11/2002 | Hutchison | | |
| 7,063,430 B2 | 6/2006 | Greiner | | |
| 7,637,626 B2 * | 12/2009 | Park et al. | ................. | 362/249.02 |
| 2002/0085379 A1 | 7/2002 | Han et al. | | |
| 2005/0281026 A1 | 12/2005 | Yu | | |
| 2006/0002148 A1 | 1/2006 | Kim et al. | | |
| 2006/0056169 A1 | 3/2006 | Lodhie et al. | | |
| 2007/0146257 A1 | 6/2007 | Whitehead et al. | | |
| 2008/0111471 A1 | 5/2008 | Blumel et al. | | |

FOREIGN PATENT DOCUMENTS

| | | |
|---|---|---|
| DE | 92 10 340.5 | 11/1992 |
| DE | 101 02 585 | 7/2002 |
| DE | 10 2006 002 275 | 7/2006 |
| EP | 0 729 597 | 5/2002 |
| EP | 1 406 042 | 4/2004 |
| EP | 1 640 792 | 3/2006 |
| FR | 2 789 768 | 8/2000 |
| WO | WO 00/49332 | 8/2000 |
| WO | WO 2007/064001 | 6/2007 |
| WO | WO 2006/076899 | 7/2007 |

* cited by examiner

*Primary Examiner* — Y My Quach Lee
(74) *Attorney, Agent, or Firm* — Fish & Richardson P.C.

(57) ABSTRACT

An illuminating module for a lighting device includes a first number n of light sources arranged in a first array and a second number m of light sources arranged in a second array, said numbers being defined by: $m \geq 1$, $n \geq m+1$. A lighting device includes a plurality of similar illuminating modules.

26 Claims, 7 Drawing Sheets

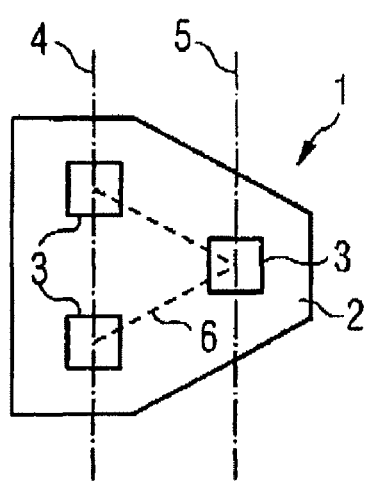
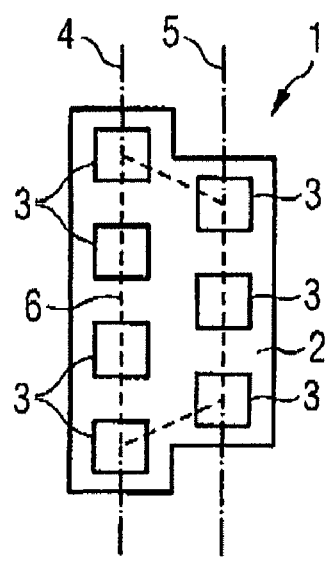
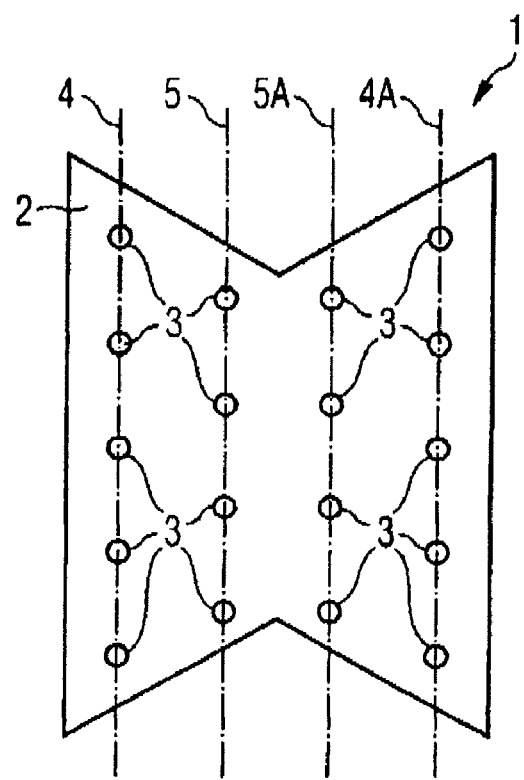

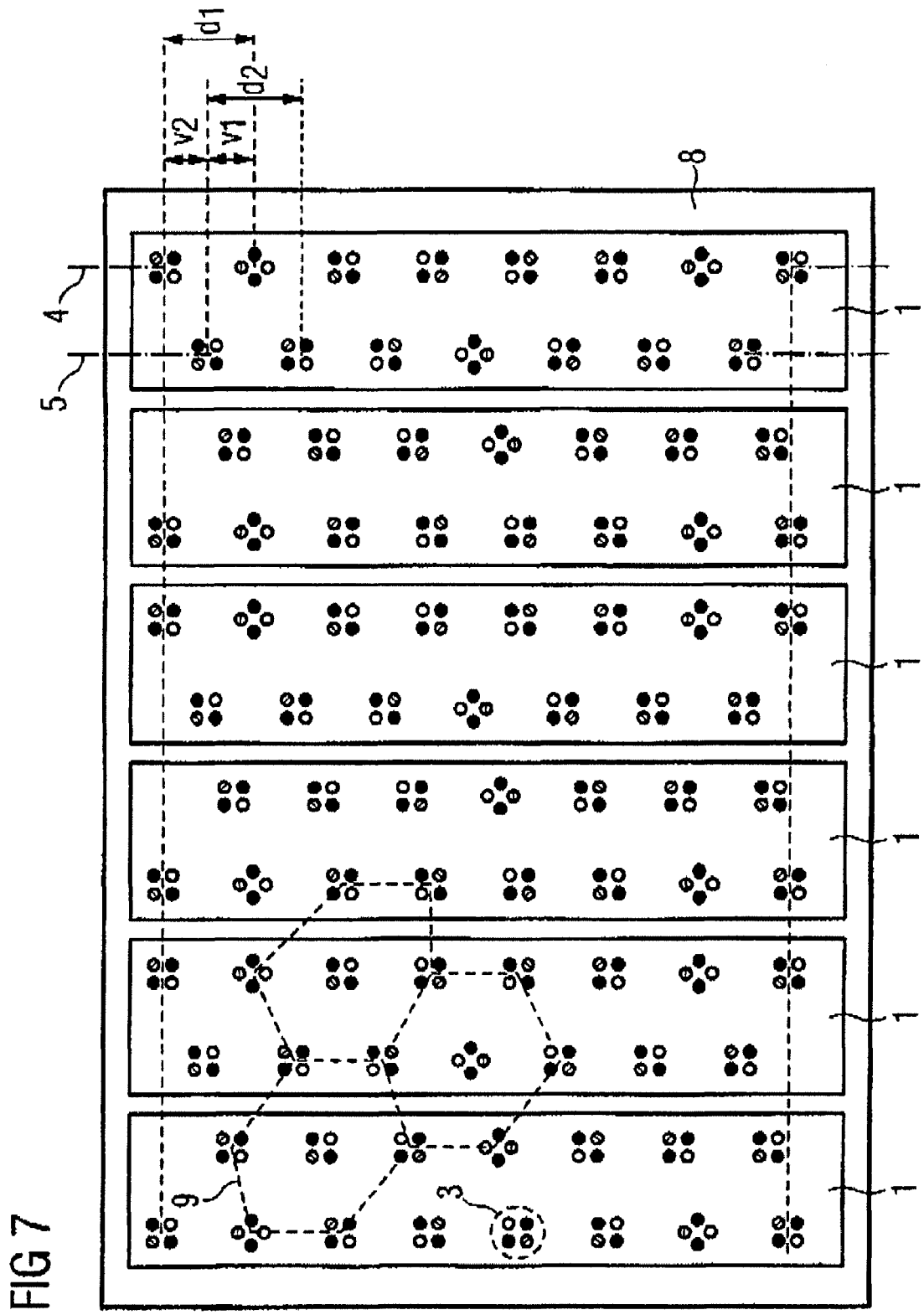

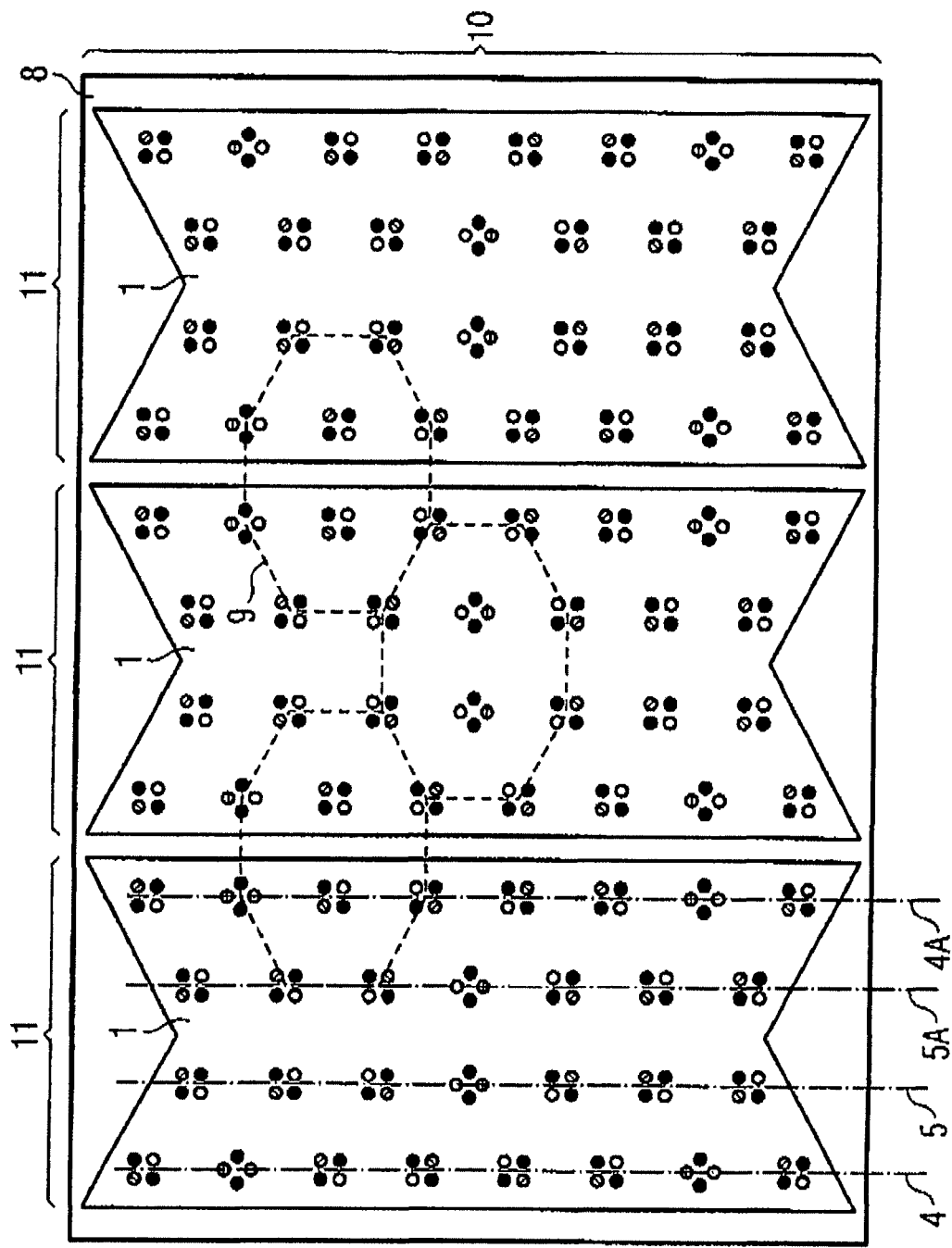

ILLUMINATING MODULE FOR A LIGHTING DEVICE

CROSS-REFERENCE TO RELATED APPLICATION

Under 35 U.S.C. §119, this application claims the benefit of a foreign priority of German Patent Application 10 2007 041 193.8, filed Aug. 31, 2007, whose disclosure content is hereby incorporated by reference in its entirety.

TECHNICAL FIELD

The invention is related to a lighting device for backlighting a display apparatus.

BACKGROUND

A lighting device for backlighting a display apparatus is known, for example, from the document WO 2006/076899 A2.

SUMMARY

It is an object of the invention to specify a lighting device that is particularly easy to manufacture.

An illuminating module for a lighting device comprises a plurality of light sources, a first number n of which are arranged in a first array and a second number m are arranged in a second array. The numbers n and m of light sources are defined by: $m \geq 1$, $n \geq m+1$. In one embodiment, the numbers n and m are defined by: $n=m+1$. The first number n has a value greater than or equal to 2, for example greater than or equal to 3. In one configuration, it has a value less than or equal to 20, particularly less than or equal to 10. The first and second arrays are, in particular, substantially parallel to each other.

In other words, the illuminating module comprises at least one pair of arrays, particularly parallel arrays, containing light sources, with a first array of the pair containing at least one more light source than the second array of the pair.

The light sources are, for example, attached to a common support element such as a circuit board. The support element has, for example, a length of 50 cm or less and a width of 30 cm or less. The illuminating module can in particular be manufactured using a standard automatic placement machine.

The support element need not be rectangular. For example, it can be implemented as trapezoidal in plan on its main plane of extension. The parallel edges of the support element particularly extend parallel to the first and second arrays.

In another configuration, the support element is implemented as T-shaped in plan on its main plane of extension. To put it another way, it has the shape of two construction beams stacked vertically one on top of the other. In particular, the first array is arranged in plan on a first of the beams and extends parallel thereto. The second array extends particularly in plan on the second of the beams.

In yet another configuration, the support element has a hexagonal shape in plan. The hexagon in this case is composed, for example, of a rectangular region containing the first array and a trapezoidal region containing the second array, and particularly tapers down toward the first array.

In one embodiment, the illuminating module comprises exactly n+m light sources. The illuminating module thus has no additional light sources besides the n light sources in the first array and the m light sources in the second array. To put it another way, all the light sources of the illuminating module in this embodiment are arranged in exactly one pair of arrays containing light sources, with a first array of said pair containing at least one more light source than the second array of the pair. In particular, the illuminating module comprises an uneven number $2i+1$ of light sources, i being a natural number. In one configuration, i has a value between 1 and 15, for example between 2 and 10, limits included in each case.

In another configuration, the light sources are arranged at the corners, or at the corners and on the sides, of an imaginary trapezoid or triangle. In particular, the trapezoid in this case has two parallel sides of different lengths, the longer of which, identified as the base of the trapezoid, forms an angle of less than 90° with the two adjacent sides of the trapezoid, the legs of the trapezoid. Preferably the n+m light sources are arranged on the two parallel sides, the n light sources arranged in the first array particularly being arranged on the base of the trapezoid.

In another embodiment, the illuminating module comprises at least two pairs of arrays containing light sources, with a first array in each pair containing at least one more light source than the second array. All the arrays of light sources particularly extend parallel to one another and succeed one another in a direction perpendicular to the direction of extension of the arrays. For example, the first or second arrays of two consecutive pairs face each other. In an improvement, all first arrays each have the same number of light sources and/or all second arrays each have the same number of light sources.

In one configuration of this embodiment, the illuminating module comprises, in addition to the first array containing n light sources and the second array containing m light sources, an additional first array containing the first number n of light sources and an additional second array containing the second number m of light sources. The first array, the second array, the additional second array and the additional first array succeed one another particularly in that order and are preferably substantially parallel to one another. In one configuration, the light sources of the first and second arrays are arranged on an imaginary trapezoid and the light sources of the additional first and additional second arrays are arranged on an additional trapezoid, with the shorter of the two parallel sides of each trapezoid and of each additional trapezoid facing each other.

To generate light, in one configuration of the illuminating module, at least one of the light sources comprises an emitter element which is an organic or inorganic light-emitting diode (LED) or a laser diode. In one embodiment, said LED or laser diode is an optoelectronic semiconductor chip, which is, for example, attached directly to a support plate of the illuminating module. In an alternative embodiment, said element is an optoelectronic semiconductor component provided with a housing containing an optoelectronic semiconductor chip such as an LED chip or a laser diode chip. In this embodiment, the housing is, for example, attached to a support plate of the illuminating module. In one configuration, the LED when operating emits light that creates a white color impression.

In an improvement, at least one of the light sources comprises a plurality of emitter elements. For example, the light source comprises two emitter elements that emit light of different colors when the illuminating module is operating. For example, the light source comprises one red, one green and/or one blue emitter element. The light source when operating particularly emits light that creates a white color impression.

The distance between two emitter elements of a light source is particularly smaller, for example by a factor of 2 or more, preferably of 5 or more, than the distance between two adjacent light sources. The distances and angles between light sources and between emitter elements are to be understood in the present context particularly as the distances between the geometric foci of said light sources or emitter elements.

In another configuration, the first and/or the last light source of the first array is rotated relative to another light source of the illuminating module by an angle α in a plane defined by the first and second arrays. The first and last light sources of the first array and the other light source of the illuminating module may be, for example, similar light sources, particularly comprising two emitter elements which when operating emit light of different colors. For example, in the case of the first or the last light source, a distance vector runs between the two emitter elements in a first direction, and in the case of the other light source, in a second direction rotated with respect to the first direction by the angle α in the plane defined by the first and second arrays. The first and/or the last light source is/are, for example, rotated by angle α with respect to the next light source after the first or last light source in the first array, with respect to the other light sources of the first array, and/or with respect to one, more than one or all of the light sources of the second array.

In an improvement of this configuration, each of the light sources of the first array is rotated with respect to the next and/or the previous light source in the first array and/or each of the light sources of the second array is rotated with respect to the next light source in the first array. In one configuration, the light sources are rotated relative to one another in such a way that in the case of any two adjacent light sources, the emitter elements the least distance from the respective adjacent light source emit light of different colors. In other words, the first light source of two adjacent light sources has a first emitter element and the second light source of said two adjacent light sources has a second emitter element, the first emitter element being that emitter element of the first light source which is the least distance from the second light source and emitting light of a first color, and the second emitter element being the emitter element the least distance from the first light source and emitting light of a second color.

In another configuration, the light sources of the illuminating module are similar light sources. Similar light sources particularly comprise the same number and type of emitter elements in the same geometrical arrangement.

In another configuration, any two consecutive light sources in the first array and/or any two consecutive light sources in the second array are the same distance apart. In another configuration, a light source of the second array is arranged between two consecutive light sources of the first array, considered in the direction of extension of the first array.

In an improvement, it is arranged midway between the two consecutive light sources. In this improvement, the distance vectors of the two consecutive light sources of the first array and the light source of the second array form an imaginary equilateral triangle, with the distance vectors between either of the light sources of the first array and the light source of the second array forming the legs of the equilateral triangle.

A lighting device comprises a plurality of similar illuminating modules according to at least one of the previously described configurations. A light device equipped with such illuminating modules has a particularly uniform luminance distribution. A lighting device equipped with a plurality of similar illuminating modules, particularly a lighting device in which all the illuminating modules are similar, is particularly easy and inexpensive to manufacture.

In one configuration, the light sources of the illuminating modules are arranged at the grid points of an imaginary octagonal or hexagonal grid. Said octagonal or hexagonal grid can be a distorted octagonal or a distorted hexagonal grid.

By means of light sources arranged on the grid points of an octagonal or hexagonal grid, for example a rectangular light outcoupling surface of the lighting device can be illuminated particularly uniformly when the light sources are in operation. Arranging the light sources on the grid points of an octagonal or hexagonal grid particularly makes it possible to achieve high uniformity with a relatively small number of light sources.

Such arrangement on an octagonal or hexagonal grid is obtained in a simple manner with light sources of similar illuminating modules which, in particular, comprise a trapezoidal, T-shaped or hexagonal support element. The lighting device can be manufactured particularly inexpensively in this way. Different-sized lighting devices can be manufactured with the same illuminating modules.

In one configuration, the illuminating modules are arranged in at least one row and at least two columns. Said at least one row and said at least two columns run substantially perpendicular to each other. The first and second arrays of light sources of the illuminating modules run, for example, substantially parallel to the direction in which the columns extend. In other words, the first and second arrays of light sources and the columns extend parallel to one another and perpendicular to the at least one row. In particular, the columns and rows run parallel to the edges of the light outcoupling surface.

The at least one row and the at least two columns span a surface. In this surface, in one configuration, two consecutive illuminating modules in a said row are rotated in opposite directions 180° about the surface normal. In other words, the illuminating modules arranged in a row in two consecutive columns are oriented such that either the second arrays or the first arrays of illuminating modules face each other.

In another configuration, the lighting device comprises at least two rows, and any two consecutive illuminating modules in a column are rotated in opposite directions 180° about the surface normal of the surface spanned by the rows and columns. In other words, the illuminating modules arranged in two consecutive rows of a column are oriented such that the second array of the one illuminating module prolongs, particularly linearly, the first array of the other illuminating module.

Such illuminating modules rotated with respect to one another result in a particularly uniform distribution of the light sources of plural illuminating modules, and particularly an arrangement of the light sources of plural illuminating modules in an octagonal or hexagonal grid.

In a further configuration, the at least two columns each contain an uneven number, particularly the same uneven number, of illuminating modules. The number of illuminating modules per column thus is, particularly, $2j-1$, j being a natural number. For example, in the case of a rectangular light outcoupling surface, in this configuration, for any two corners of the light outcoupling surface that are next to each other in the column direction, the least distance from the corner to one of the light sources is the same. In one configuration, the at least two columns each contain one, three, five or seven illuminating modules.

In another configuration, the at least one row contains an even number of illuminating modules. The number thus is $2k$, k being a natural number, which in one configuration has a value greater than or equal to 1, for example greater than or equal to 2, and less than or equal to 10, particularly less than or equal to 5. For example, in the case of a rectangular light outcoupling surface and illuminating modules with n+m light sources, in this configuration, for any two corners of the light outcoupling surface that are next to each other in the row direction, the least distance from the corner to one of the light sources is the same.

The illuminating modules are arranged, for example, such that for each corner of the rectangular light outcoupling surface, the light source the smallest distance from the corner is disposed in the first array or the additional first array of one of the illuminating modules. The smallest distances are preferably the same for each of the corners. Good illumination of the corner-adjacent areas of the light outcoupling surface is achieved in this way.

The lighting device comprises, for example, (2j−1) rows and 2k columns of illuminating modules, each containing (2i+1) light sources, i, j and k being natural numbers. The number of light sources in the lighting device is then (2i+1)×(2j−1)×2k.

In one configuration, the illuminating modules of a first one of the at least two columns are offset in the direction of extension of the columns with respect to the second of the at least two columns succeeding the first columns. This results, for example, in a lighting device in which the light sources are arranged in a regular hexagonal grid.

The lighting device is, for example, contained in a backlighting apparatus, particularly in a backlighting apparatus for a display apparatus. The display apparatus comprises, for example, an image-generating display unit, particularly an LCD panel (LCD=liquid crystal display), which in operation is backlit by the lighting device. The display apparatus is for example a television set, for instance one with a display unit whose diagonal has, for example, a length of 46 inches or 70 inches. Alternatively, the backlighting apparatus can be a light box for backlighting a display screen such as an advertising panel.

In another embodiment, the lighting device is contained in a lighting apparatus for general lighting purposes, for example for lighting an interior space such as a room in a home or office.

DESCRIPTION OF DRAWINGS

Further embodiments and configurations will become apparent from the exemplary embodiments described below in conjunction with FIGS. 1 to 8.

FIG. 1 shows an illuminating module according to a first exemplary embodiment.

FIG. 2 shows an illuminating module according to a second exemplary embodiment.

FIG. 4 shows an illuminating module according to a fourth exemplary embodiment.

FIG. 7 shows a lighting device according to a seventh exemplary embodiment.

FIG. 8 shows a lighting device according to an eighth exemplary embodiment.

DETAILED DESCRIPTION

Figure 3A:
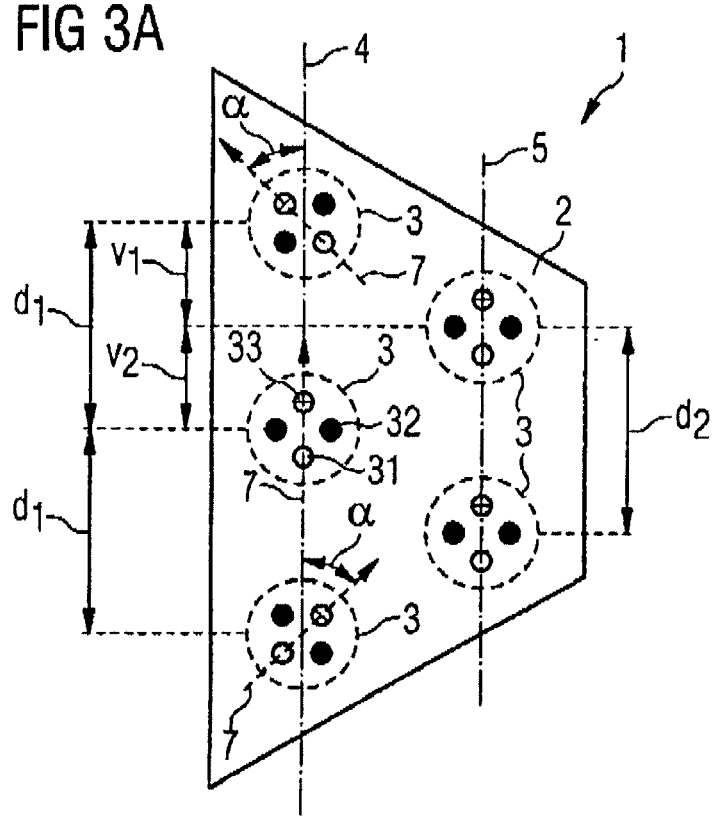
FIG. 3A shows an illuminating module according to a third exemplary embodiment.

In the exemplary embodiments and figures, like or like-acting elements are provided with the same respective reference numerals. The figures, which represent schematic plan views, and the size relationships of the elements shown in the figures are basically not to be considered true to scale. Rather, individual elements may be depicted as exaggeratedly large for the sake of better understanding and/or better visualization.

FIG. 1 represents a first exemplary embodiment of an illuminating module in a schematic plan view. The illuminating module 1 has a circuit board 2 as support element, on which are mounted three light sources 3.

Of the three light sources 3, a first number, specifically two light sources 3, are arranged in a first array 4, and a second number, in the present case just one light source 3, are arranged in a second array 5. In the first exemplary embodiment, the light sources 3 are arranged at the corners of an imaginary triangle 6. The triangular surface of said triangle 6 is in particular parallel to the main plane of extension of the circuit board 2.

In the first exemplary embodiment, the support element 2 has a hexagonal shape in plan. The hexagon in the present case is composed of a rectangular area containing the first array 4 and a trapezoidal area containing the second array 5, and for example tapers down toward the first array 4.

FIG. 2 shows a second exemplary embodiment of an illuminating module 1 in a schematic plan view. The illuminating module according to this exemplary embodiment differs from the illuminating module of the first exemplary embodiment by the fact that it contains seven light sources, four of which are arranged in the first array 4 and three in the second array 5. The first number n and the second number m thus have the values n=4 and m=3.

The first and last light sources 3 of the first array 4 and of the second array 5 are arranged at the corners of an imaginary trapezoid 6, which particularly extends parallel to the main plane of extension of the support element 2. The other light sources 3 are arranged on the two parallel sides of the trapezoid 6. The first array 4 coincides with the longer of the two parallel sides of the trapezoid 6 and the second array 5 with the shorter of the two parallel sides. The longer of the two parallel sides, the base of the trapezoid, forms an angle of less than 90° with the two adjacent sides of the trapezoid, i.e. the legs.

In the second exemplary embodiment, the support element 2 is implemented as T-shaped in plan. To put it another way, it has the shape of two construction beams stacked vertically one on top of the other. In particular, the first array 4 is arranged in plan on a first one of the beams and extends parallel thereto. The second array 5 extends particularly in plan on the second of the beams.

FIG. 3A depicts a third exemplary embodiment of the illuminating module 1 in a schematic plan view. As in the second exemplary embodiment, the light sources 3 are arranged at the corners and on the edges of an imaginary trapezoid 6. The illuminating module 1 according to the third exemplary embodiment has three light sources 3 arranged in the first array 4 (n=3) and two light sources arranged in the second array 5 (m=2).

All five light sources 3 of the illuminating module according to the third exemplary embodiment are similar in composition. Each light source 3 has, in the present case, four emitter elements 31, 32, 33. The emitter elements 31, 32, 33 are arranged at the corner points of an imaginary parallelogram, such as a rhombus, a rectangle or a square. The light sources are, for example, LED components containing an inorganic LED chip, i.e., a light-emitting optoelectronic semiconductor chip comprising an inorganic semiconductor material.

The light source for example comprises two green LEDs 32, which are arranged at two mutually opposite corners of the imaginary parallelogram. The light source further comprises in the present case one red LED component 31 and one blue LED component 33, which are arranged at the other two mutually opposite corners of the imaginary parallelogram.

Any two consecutive light sources of the first array 4 are the same first distance $d_1$ apart.

Any two consecutive light sources 3 of the second array 5 are a second distance $d_2$ apart. First and second distances $d_1$ and $d_2$ are the same in the present case. In particular, first and second distances $d_1$, $d_2$ are at least twice, preferably at least five times, the distances between the emitter elements 31, 32, 33 of a light source 3.

Each light source 3 of the second array 5 is arranged, in projection on the first array 4, between two consecutive light sources 3 of said first array 4. It is offset by a length $v_1$ from the first of the two consecutive light sources 3 and by a length $v_2$ from the second of the two consecutive light sources 3, taken in the direction of extension of the first array 4 and the second array 5. To put it another way, distance $d_1$ is divided into two segments by the two lengths $v_1$ and $v_2$.

Lengths $v_1$ and $v_2$ are the same in the present case. In other words, the light source 3 of the second array 5 is arranged midway between the two consecutive light sources 3 of the first array 4, taken in the direction of extension of first and second arrays 4, 5.

In the illuminating module 1 according to FIG. 3A, the first and last light sources 3 of the first array 4 are rotated with respect to the other light source 3 of the first array 4 by an angle $\alpha$ in the plane spanned by the first array 4 and the second array 5.

In the light sources 3 of the illuminating module 1 according to the third exemplary embodiment, angle $\alpha$ is defined, for example, by the orientation of two emitter elements 31, 32, 33 of the light sources 3, for example between the red emitter element 31 and the blue emitter element 33. In particular, a connection vector between two emitter elements 31, 32, 33 in the first or last light source 3 of the first array 4 is rotated by angle $\alpha$ with respect to the corresponding connection vector of the other light source 3 of the first array 4. The connection vectors are indicated in FIG. 3A by arrows 7.

Except for the first and last light sources 3 of first array 4, the light sources 3 in illuminating module 1 according to the exemplary embodiment of FIG. 3A are mounted in the same orientation on the circuit board 2.

Figure 3B:
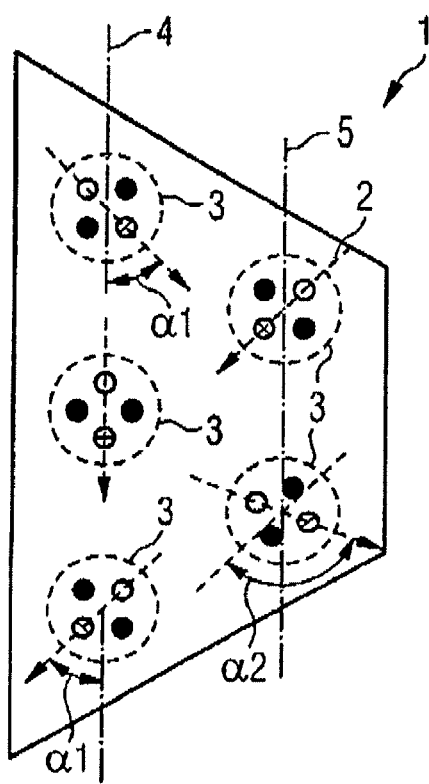
FIG. 3B shows an illuminating module according to a variant of the third exemplary embodiment.

In the variant of the third exemplary embodiment depicted schematically in a plan view of the circuit board 2 in FIG. 3B, every two consecutive light sources 3 in the first array 4 and in the second array 5 are rotated relative to each other.

The orientation in this case is so selected that those emitter elements 31, 32, 33 of adjacent light sources 3 which are the least distance apart emit light of different colors when operating. In particular, every two consecutive light sources 3 of the first array 4 are rotated relative to each other by an angle $\alpha_1$ and every two consecutive light sources 3 of the second array 5 are rotated relative to each other by an angle $\alpha_2$. In one configuration, angles $\alpha_1$ and $\alpha_2$ are different. In the present case, by way of example, angle $\alpha_1$ is 60° and angle $\alpha_2$ is 120°.

In the third exemplary embodiment, the support element 2 of the illuminating module 1 is implemented as trapezoidal in plan. The edges of the support element 2 extend parallel to the sides of the imaginary trapezoid 6 on which the light sources 3 are arranged.

FIG. 4 represents a fourth exemplary embodiment of an illuminating module 1, depicted schematically in plan. Whereas in the illuminating modules 1 according to the preceding exemplary embodiments, exactly two arrays of light sources 3—that is, first array 4 and second array 5—were contained in the illuminating module 1, the illuminating module 1 according to the fourth exemplary embodiment comprises an additional second array 5A of light sources 3 and an additional first array 4A of light sources 3. In the present case, the additional first array 4A of light sources 3, like the first array 4, contains five light sources 3, and the additional second array 5A, like the second array 5, contains four light sources 3. First array 4, second array 5, additional second array 5A and additional first array 4A are parallel to one another and succeed one another in that order.

Figure 5:
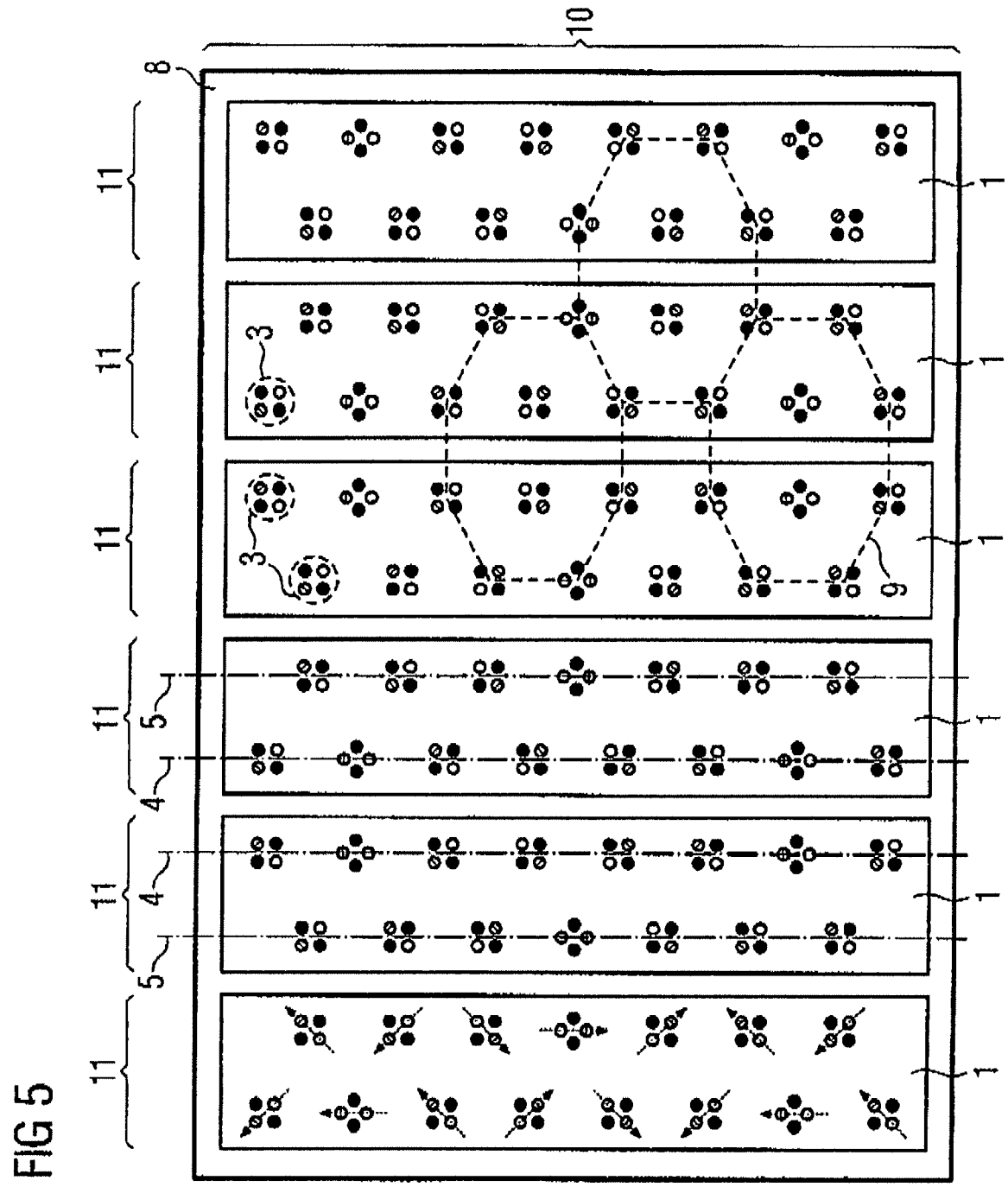
FIG. 5 shows a lighting device according to a fifth exemplary embodiment.

Illustrated in FIG. 5 is a schematic plan view of a lighting device for a backlighting apparatus according to a fifth exemplary embodiment.

The lighting device comprises a light outcoupling surface 8 that is illuminated by the light sources 3 of a plurality of illuminating modules 1. Light outcoupling surface 8 is transparent in the present case.

A backlighting apparatus comprising the lighting device of the fifth exemplary embodiment has, in one configuration, a diffuser plate through which light coupled out of the light outcoupling surface 8 of the lighting device passes and which blends light emitted by the light sources when operating. A particularly uniform color impression and/or a particularly uniform luminance distribution is obtained in this way.

The illuminating module 1 of the lighting device of the fifth exemplary embodiment is so arranged that all first arrays 4 and all second arrays 5 are parallel to one another.

All the illuminating modules 1 are similar in composition. Like the illuminating module 1 according to FIG. 3B, they comprise light sources 3 that are rotated relative to one another. In contrast to the illuminating module 1 according to FIG. 3B, however, here the first number n of light sources 3 is not three, but eight, and the second number m of light sources is not two, but seven.

The illuminating modules 1 are here arranged in one row 10 and six columns 11. The columns 11 run parallel to the direction of the first and second arrays 4, 5, and the row 10 runs perpendicular to that direction.

The illuminating modules are so oriented that either the second arrays 5 or the first arrays 4 of any two consecutive illuminating modules in the row 10 face each other. To put it another way, any two consecutive illuminating modules 1 in the row 10 are rotated 180° relative to each other in the plane spanned by the first and second arrays 4, 5.

The illuminating modules 1 are arranged in such a way that for each corner of the rectangular light outcoupling surface 8, a light source 3 belonging to the first array 4 of one of the illuminating modules 1 is the least distance from said corner. In this way, the distance from the corner is particularly small and the corner is advantageously illuminated particularly uniformly.

The distance between mutually facing first arrays 4 and the distance between the second arrays 5 of two consecutive illuminating modules 1 in the row 10 is selected, for example, to be exactly the same as the distance between the first array 4 and the second array 5 of an illuminating module 1.

The light sources 3 of the lighting device are arranged on an octagonal grid 9 in the present case. The lighting device in the present case contains 90 light sources 3.

The lighting device is provided, for example, for a backlighting apparatus in a display apparatus such as a television set having a screen diagonal of 46". The light outcoupling surface 8 of the lighting device then has, for example, a length of 102 cm and a height of 57 cm. The length, in this context, is the extent in the line direction and the height is the extent in the column direction.

Figure 6A:
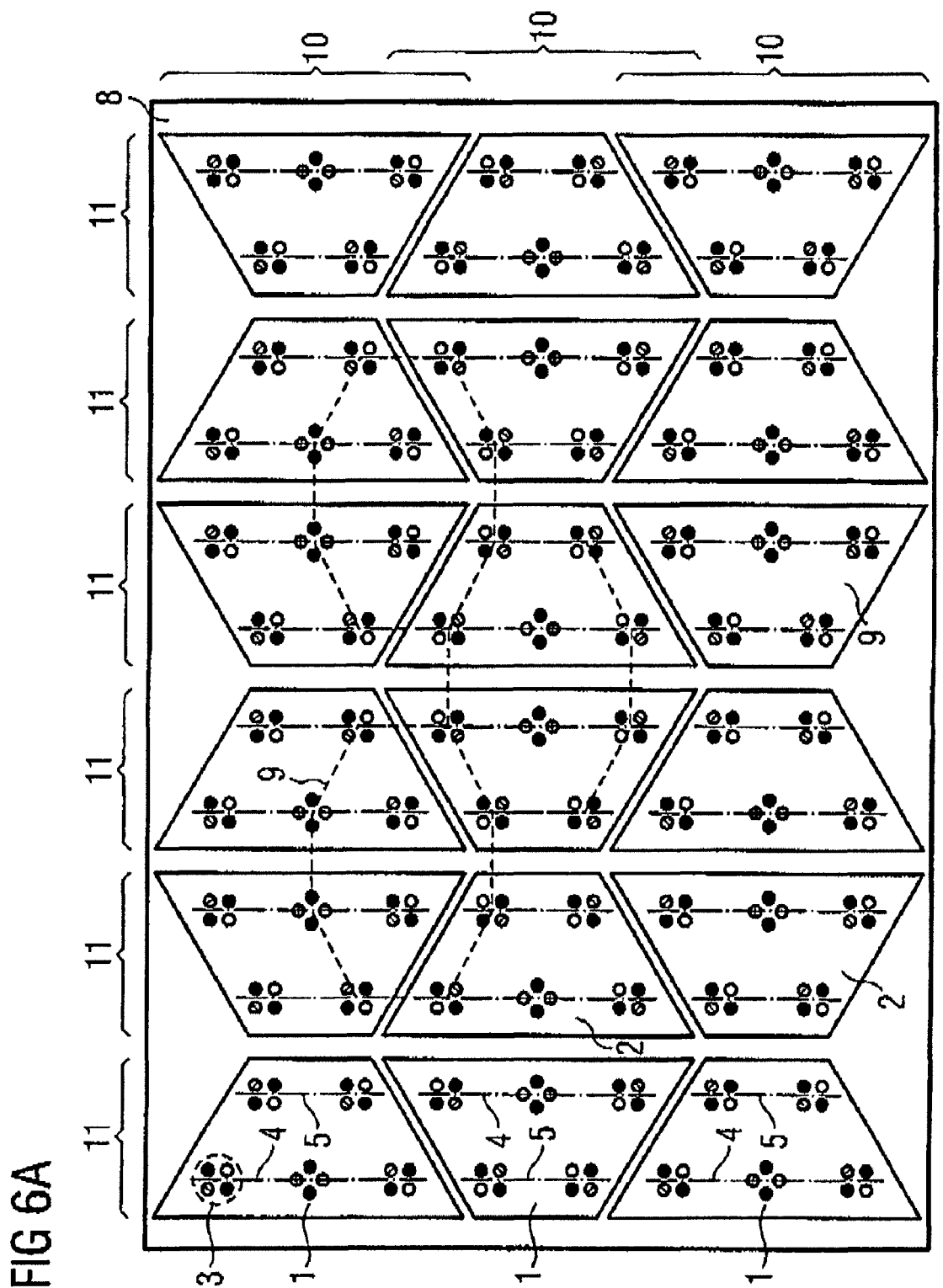
FIG. 6A shows a lighting device according to a sixth exemplary embodiment.

The lighting device according to the sixth exemplary embodiment, illustrated in FIG. 6A, differs from the lighting device according to the fifth exemplary embodiment in that the illuminating modules 1 are arranged not in just one row 10, but in three rows 10.

Two consecutive illuminating modules 1 in a column 11, these being in the present case the illuminating modules according to the variant of the third exemplary embodiment (see FIG. 3B), are rotated 180° relative to one another in the plane spanned by the first and second arrays 4, 5 and thus by the rows 10 and columns 11. The first array 4 of light sources 3 of an illuminating module 1 is prolonged by the second array 5 of the next illuminating module 1 in the same column 11, and vice versa.

The circuit boards 2 are here implemented as trapezoidal. The parallel edges of the circuit boards 2 extend in the same direction as the columns 11. The facing edges of two consecutive illuminating modules 1 in a column 11 in the present case extend parallel to each other and in particular are contiguous. The illuminating modules 1 are preferably arranged such that any two light sources 3 of the lighting device that succeed each other in the column direction are the same distance apart.

Figure 6B:
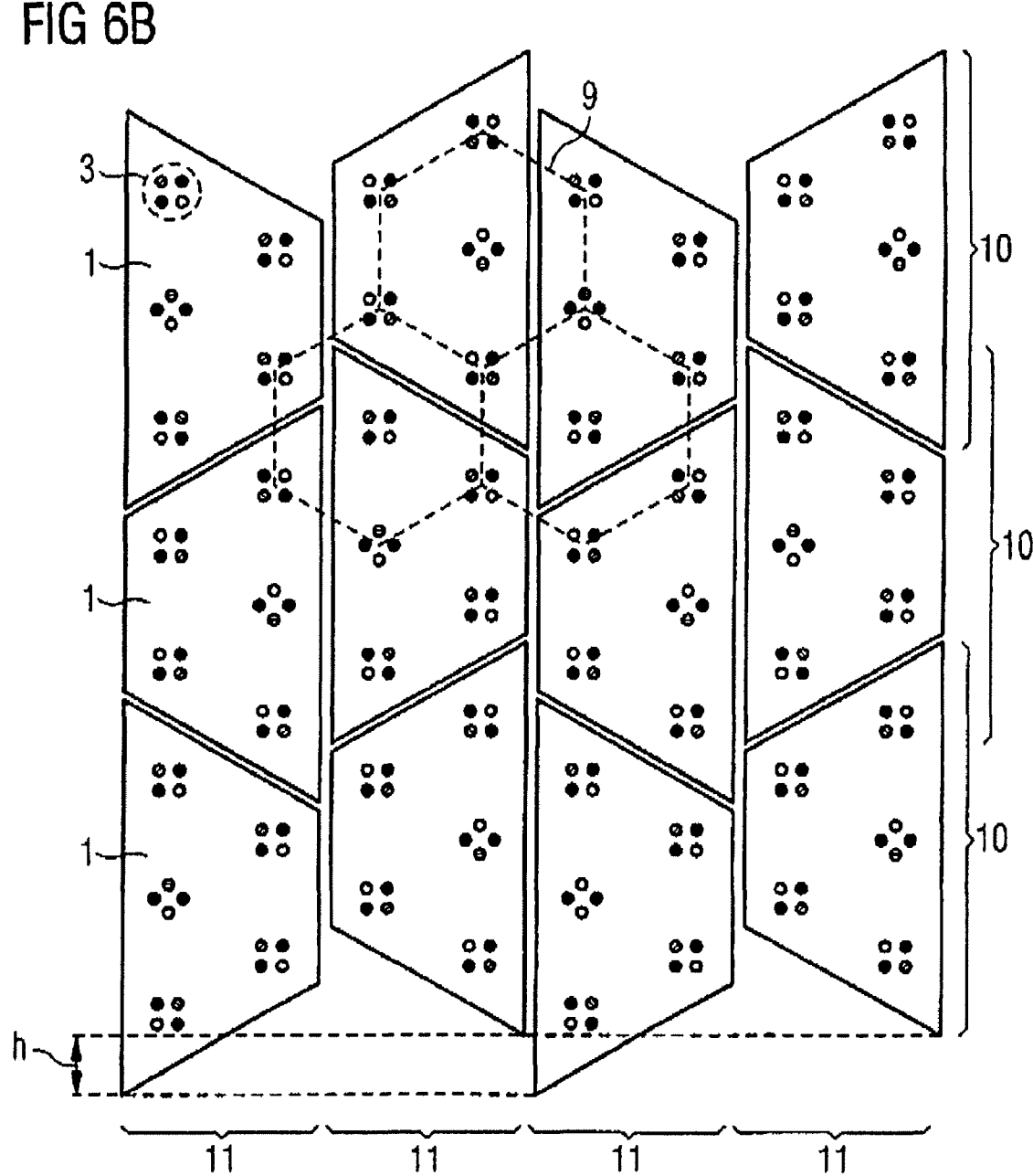
FIG. 6B shows a detail of a lighting device according to a variant of the sixth exemplary embodiment.

FIG. 6B shows a detail of a lighting device according to a variant of the sixth exemplary embodiment in a schematic plan view.

In this exemplary embodiment, any consecutive two illuminating modules 1 in a row 10 are offset from each other by a length h, termed the offset, in the direction of the columns 11. A lighting device in which the light sources 3 are arranged on a regular hexagonal grid is obtained in this way.

In the seventh exemplary embodiment of the lighting device, depicted in FIG. 7, the light sources 3 are also arranged on a hexagonal grid 9. However, in contrast to the hexagonal grid according to the exemplary embodiment of FIG. 6B, the hexagonal grid in the seventh exemplary embodiment is distorted. In contrast to the exemplary embodiment of FIG. 6B, here the light sources 3 adjacent the corners of the illuminating surface 8 are each the same distance from the corner. The uniformity of the luminance in the region of the corners is advantageously increased in this way.

In the exemplary embodiment of FIG. 7, the hexagonal arrangement 9 is arrived at by the fact that the light sources 3 in the second array 5 of illuminating modules 1 are not arranged midway between two consecutive light sources 3, considered in the direction of the first or second array 4, 5. Hence, segments $v_1$ and $v_2$ are not equal. They instead divide the distance between two consecutive light sources 3 in the first array 4, for example in a ratio $5:1 \geq v_1:v_2 \geq 1.5:1$, preferably $4:1 \geq v_1:v_2 \geq 2:1$.

In the eighth exemplary embodiment of the lighting device, depicted in FIG. 8, the illuminating modules 1 used are the same as those of the fourth exemplary embodiment, illustrated in FIG. 4. In deviation from the fourth exemplary embodiment, here the first and additional first arrays 4, 4A comprise eight light sources and the second and additional second arrays 5, 5A each comprise seven light sources.

The illuminating modules 1 are so arranged in one row 10 and three columns 11 that each additional first array 4A of an illuminating module 1 faces a first array 4 of the next illuminating module 1 in the row 10.

The invention is not limited to the exemplary embodiments by the description of it with reference thereto. Rather, the invention encompasses any novel feature and any combination of features, including in particular any combination of features recited in the claims, even if that feature or combination itself is not explicitly mentioned in the claims or exemplary embodiments.

What is claimed is:

1. An illuminating module for a lighting device, the illuminating module comprising:
    a first number n of light sources arranged in a first array and a second number m of light sources arranged in a second array, said numbers being defined as follows: $m \geq 1$, $n \geq m+1$; and
    an additional first array containing the first number n of light sources and an additional second array containing the second number m of light sources, wherein said first array, said second array, said additional second array and said additional first array succeed one another in that order and are substantially parallel to one another.

2. The illuminating module as in claim 1, wherein said first number n and said second number m of light sources are defined by: $n=m+1$.

3. The illuminating module as in claim 1, wherein said first and second arrays are substantially parallel to each other.

4. The illuminating module as in one claim 1, comprising exactly n+m light sources.

5. The illuminating module as in claim 1, wherein said light sources are arranged at the corners, or at the corners and on the sides, of an imaginary trapezoid or triangle.

6. The illuminating module as in claim 1, wherein at least one of the light sources comprises, as emitter element, an organic or inorganic light-emitting diode or a laser diode.

7. The illuminating module as in claim 1, wherein at least one of said light sources comprises a plurality of emitter elements.

8. The illuminating module as in claim 7, wherein said at least one light source comprises two emitter elements that emit light of different colors when said illuminating module is operating.

9. The illuminating module as in claim 8, comprising one red, one green and one blue emitter element.

10. The illuminating module as in claim 1, wherein the first and the last said light source in said first array are rotated with respect to another said light source of said illuminating module by an angle α in a plane defined by said first and second arrays.

11. The illuminating module as in claim 1, wherein any two consecutive said light sources in said first array and/or any two consecutive said light sources in said second array are the same distance apart.

12. A lighting device comprising a plurality of similar illuminating modules as in claim 1.

13. The lighting device as in claim 12, wherein the light sources of said illuminating modules are arranged at the grid points of an imaginary octagonal or hexagonal grid.

14. The lighting device as in claim 12, wherein said illuminating modules are arranged in at least one row and at least two columns, it being the case that
    said at least one row runs substantially perpendicularly to said columns,
    said first and second arrays of light sources of said illuminating modules run substantially parallel to the direction in which said columns extend.

15. The lighting device as in claim 14, wherein any two consecutive said illuminating modules in a row are rotated relative to each other approximately 180° about a first surface normal of a second surface spanned by said at least one row and said columns.

16. The lighting device as in claim 14 and comprising at least two rows, wherein any two consecutive said illuminating modules in a column are rotated relative to each other by approximately 180° about a first surface normal of a second surface spanned by said at least one row and said columns.

17. The lighting device as in claim 14, wherein said at least two columns each contain an uneven number of illuminating modules.

18. The lighting device as in claim 14, wherein said at least one row contains an even number of illuminating modules.

19. The lighting device as in claim 12 and comprising a rectangular or square light outcoupling surface, wherein for each corner of said light outcoupling surface, the light source the least distance from said corner is arranged in the said first array or the said additional first array of one of said illuminating modules.

20. The lighting device as in claim 19, wherein said least distance is the same for each of said corners.

21. The lighting device as in claim 14, wherein said illuminating modules in a first one of said two columns are offset in the main direction extension of said columns from the said illuminating modules of the second of said two columns.

22. A backlighting apparatus comprising a lighting device as in claim 12.

23. A display apparatus comprising a backlighting apparatus as in claim 22.

24. The display apparatus as in claim 23 and comprising an image-generating display unit, particularly an LCD panel, which when operating is backlit by said lighting device.

25. A lighting system for general lighting purposes, comprising at least one lighting device as in claim 12.

26. A lighting device comprising:
a plurality of similar illuminating modules each comprising a first number n of light sources arranged in a first array and a second number m of light sources arranged in a second array, said numbers being defined as follows: $m \geq 1$, $n \geq m+1$, wherein said illuminating modules are arranged in at least one row and at least two columns, it being the case that:
said at least one row runs substantially perpendicularly to said columns; and
said first and second arrays of light sources of said illuminating modules run substantially parallel to the direction in which said columns extend.

* * * * *